United States Patent [19]

Negi

[11] Patent Number: 5,732,089
[45] Date of Patent: Mar. 24, 1998

[54] BIT ERROR MEASUREMENT CIRCUIT

[75] Inventor: Keiji Negi, Tokyo, Japan

[73] Assignee: Ando Electric Co., Ltd., Tokyo, Japan

[21] Appl. No.: 721,059

[22] Filed: Sep. 26, 1996

[30] Foreign Application Priority Data

Sep. 27, 1995 [JP] Japan ................................. 7-273422
Sep. 27, 1995 [JP] Japan ................................. 7-273427

[51] Int. Cl.$^6$ ................................................ G06F 11/00
[52] U.S. Cl. .......................................................... 371/5.1
[58] Field of Search ............................. 371/5.1, 5.2, 5.4, 371/5.5, 6, 20.1, 20.4; 375/208, 206

[56] References Cited

U.S. PATENT DOCUMENTS

| | | | |
|---|---|---|---|
| 5,610,940 | 3/1997 | Duvrant et al. | 375/208 |
| 5,633,632 | 5/1997 | Ido et al. | 341/58 |

*Primary Examiner*—Vincent P. Canney
*Attorney, Agent, or Firm*—Finnegan, Henderson, Farabow, Garrett & Dunner, L.L.P.

[57] ABSTRACT

A bit error measurement circuit is designed to measure a number of bit errors by comparing receiving data with a reference Pseudo-Noise pattern. Herein, a certain PN pattern is used as the receiving data in order to perform testing in performance of communications and transmission by evaluating the receiving data. There are provided multiple kinds of PN patterns each having a specific PN-stage number. The bit error measurement circuit is capable of automatically detecting a PN-stage number with respect to the receiving data. One method to do so is to perform comparison between the receiving data and an arbitrary pattern at timings which are periodically set to correspond to all PN-stage numbers each having a probability to be related to the receiving data, wherein the arbitrary pattern is extracted from the receiving data. Thus, the PN-stage number is automatically detected in response to the timing at which the receiving data coincide with the arbitrary pattern. Another method is to extract consecutive-0s patterns and consecutive-1s patterns from the receiving data and to perform comparison between a count value, corresponding to a number of bits of a longest consecutive-0s pattern, and a count value corresponding to a number of bits of a longest consecutive-1s pattern. So, a PN-stage number and a logic are detected based on result of the comparison between the count values. Thus, a reference PN pattern is generated based on the PN-stage number and the logic.

11 Claims, 8 Drawing Sheets

FIG.4

| NUMBER OF CONSECUTIVE BITS | 1S PATTERN | 0S PATTERN |
|---|---|---|
| a | 1 | 0 |
| a−1 | 0 | 1 |
| a−2 | 1 | 1 |
| a−3 | 2 | 2 |
| 2 | $2^{(a-4)}$ | $2^{(a-4)}$ |
| 1 | $2^{(a-3)}$ | $2^{(a-3)}$ |

| PN-STAGE NUMBER | PERIOD | 2 OUTPUTS SELECTED FOR EX-OR 14 |
|---|---|---|
| PN 7 | 127 | 6 EXOR 7 |
| PN 9 | 511 | 5 EXOR 9 |
| PN 11 | 2047 | 9 EXOR 11 |
| PN 15 | 32767 | 14 EXOR 15 |
| PN 17 | 131071 | 14 EXOR 17 |
| PN 23 | 4194303 | 18 EXOR 23 |

BIT ERROR MEASUREMENT CIRCUIT

BACKGROUND OF THE INVENTION

The invention generally relates to bit error evaluation devices, and more particularly to bit error measurement circuits which measure a number of bit errors for the testing of communications and transmission.

Pseudo-random patterns (which are called 'PN patterns', wherein 'PN' is an abbreviation for 'Pseudo Noise') are frequently used for the testing of communication devices, transmission devices and transmission lines. So, a testing evaluation device is provided to perform testing by sending and receiving the PN patterns. The testing evaluation device performs synchronization between receiving data and reference data which are generated therein, thus performing comparison between receiving data and reference data. Then, a number of bits which correspond to errors are counted to evaluate the receiving data.

In this kind of testing, a PN pattern generated by a transmitter device is received by a receiver device via a certain device or a transmission device. The PN pattern received by the receiver device is compared with a reference PN pattern which is generated by a PN pattern generation circuit provided in the receiver device. Thus, a number of bit-error events corresponding to occurrence of bit errors are counted, and its data are outputted.

FIG. 6 shows an example of the bit error measurement circuit which is designed to count a number of bit-error events in receiving data. Herein, '1' designates a receiving-data input terminal, '2' designates a bit-error-count-value output terminal, '3' designates a pull-in circuit, '4' designates a reference-PN-pattern generation circuit, '5' designates a comparison circuit, '6' designates a bit-error count circuit, and '10' designates a PN-stage-number input terminal which inputs a PN-stage number which is set in advance.

Receiving data, containing a PN pattern, received by the receiver device are inputted to the receiving-data input terminal 1. The pull-in circuit 3 monitors the receiving data so as to control the reference-PN-pattern generation circuit 4. The reference-PN-pattern generation circuit 4 is controlled to generate a reference PN pattern which synchronizes with the receiving data. The comparison circuit 5 performs comparison between the receiving data inputted to the receiving-data input terminal 1 and the reference PN pattern generated by the reference-PN-pattern generation circuit 4. Thus, the comparison circuit 5 outputs pulses, a number of which corresponds to a number of bits by which the receiving data differ from the reference PN pattern. The bit-error count circuit 6 counts a number of the pulses which are outputted from the comparison circuit 5. So, a count value is outputted to the bit-error-count-value output terminal 2.

Next, details of the reference-PN-pattern generation circuit 4 will be described with reference to FIG. 7. Herein, '11' designates a clock input terminal, '12' designates a reference-PN-pattern output terminal, '13' designates a PN-stage-number input terminal, and '14' designates an exclusive-or circuit. In addition, there are provided two select circuits, designated by '15-1' and '15-2', as well as a plurality of flip-flop circuits (FF) which are designated by numerals of '16-1', '16-2', ..., '16-m' and '16-n'.

The flip-flop circuits 16-1 to 16-n construct a shift register. In addition, the select circuits 15-1 and 15-2 receive outputs of the flip-flop circuits 16-1 to 16-n so as to select 2 outputs. The exclusive-or circuit 14 performs an exclusive-or operation on the selected 2 outputs, so that its result is inputted to the flip-flop circuit 16-1. By changing the 2 outputs which are inputted to the exclusive-or circuit 14, it is possible to obtain PN patterns each having a different period as shown in FIG. 8.

Next, FIG. 8 shows a method to generate PN patterns having different PN-stage numbers by inputting different sets of the 2 outputs selected from among the outputs of the flip-flop circuits 16-1 to 16-n. For example, when generating a PN pattern of a PN-stage number 7, the circuit of FIG. 3 performs an exclusive-or operation corresponding to '6 EXOR 7' in FIG. 8. This indicates that an exclusive-or operation is performed on outputs of the flip-flop circuits 16-6 and 16-7; thus its result is inputted to the flip-flop 16-1. FIG. 8 shows that a period of a PN pattern differs responsive to a PN-stage number. For example, a PN pattern of a PN-stage number 'a' has a period of $(2^a-1)$ bits. The receiving data may contain a pattern consisting of consecutive 'a' bits arbitrarily selected. Herein, there is a feature that such a pattern emerges only 1 time within one period of the receiving data.

The reference-PN-pattern generation circuit 4 of FIG. 7 is designed such that 2 outputs, which are selected from among the outputs of the flip-flop circuits for the exclusive-or circuit 14, are changed over by the select circuit 15-1 and 15-2 to change a PN-stage number for a reference PN pattern to be generated. That is, a signal inputted to the PN-stage-number input terminal 13 is used to change over the select circuits 15-1 and 15-2, so that the PN-pattern output terminal 12 will output PN patterns having respective PN-stage numbers.

In the bit error measurement device of FIG. 6, a PN-stage number of a PN pattern which relates to the receiving data is set by an external device (not shown) via the PN-stage-number input terminal 10 so that bit-error measurement is performed.

The aforementioned bit error measurement circuit is disadvantageous because the reference-PN-pattern generation circuit 4 cannot generate a reference PN pattern, which synchronizes with receiving data, without supplying a PN-stage number which relates to the receiving data inputted to the receiving-data input terminal 1, to the PN-stage-number input terminal 10. In other words, the bit error measurement circuit cannot perform bit-error measurement without supplying the PN-stage-number of the receiving data to the PN-stage-number input terminal 10. For this reason, it is necessary to know the PN-stage number of the receiving data to be transmitted to the bit error measurement circuit in advance. In addition, there is a problem that if a wrong PN-stage number is set by mistake, the bit error measurement circuit cannot perform bit-error measurement with accuracy.

Next, FIG. 9 shows another example of the bit error measurement circuit which is designed to count a number of bit-error events which occur in receiving data. In FIG. 9, parts equivalent to those of FIG. 6 are designated by the same numerals; hence, the description thereof will be omitted. Different from the circuitry of FIG. 6, the circuitry of FIG. 9 provides two terminals, which are connected to the reference-PN-pattern generation circuit 4, i.e., a PN-stage-number input terminal 10a and a logic input terminal 10b. The logic input terminal 10b inputs information which gives representation as to whether a positive logic or a negative logic is set to receiving data.

FIG. 10 shows an example of the reference-PN-pattern generation circuit 4 which is employed by the bit error measurement circuit of FIG. 9. In FIG. 10, parts equivalent to those of FIG. 7 are designated by the same numerals; hence, the description thereof will be omitted. Different from the circuitry of FIG. 7, the circuitry of FIG. 10 further provides a logic inversion circuit 17 coupled with a logic input terminal 18.

Like the circuitry of FIG. 7, the circuitry of FIG. 10 is designed to output PN patterns having different periods, as shown in FIG. 8, by changing 2 outputs which are selected from among outputs of the flip-flop circuits 16-1 to 16-n by the select circuit 15-1 and 15-2 and are supplied to the exclusive-or circuit 14. In other words, the reference-PN-pattern generation circuit 4 of FIG. 10 changes a PN-stage number of a PN pattern to be generated by changing over the 2 outputs which are selected by the select circuits 15-1 and 15-2 and are supplied to the exclusive-or circuit 14. That is, the select circuits 15-1 and 15-2 are changed over in response to a signal supplied to the PN-stage-number input terminal 13, so that each of PN patterns having respective PN-stage numbers can be provided as an output of the flip-flop circuit 16-n.

The logic inversion circuit 17 selectively performs inversion on the output of the flip-flop circuit 16-n in response to data supplied to the logic input terminal 18. Thanks to operation of the logic inversion circuit 18, the reference-PN-pattern generation circuit 4 of FIG. 10 is capable of outputting either a PN pattern having a positive logic or a PN pattern having a negative logic.

Incidentally, the PN-stage-number input terminal 10a and the logic input terminal 10b of the bit error measurement circuit of FIG. 9 respectively correspond to the PN-stage-number input terminal 13 and the logic input terminal 18 of the reference-PN-pattern generation circuit 4 of FIG. 10.

This bit error measurement circuit of FIG. 9 is disadvantageous because the reference-PN-pattern generation circuit 4 cannot generate a reference PN pattern, which synchronizes with receiving data, without supplying a PN-stage number and a logic, which relate to receiving data inputted to the receiving-data input terminal 1, to the PN-stage-number input terminal 10a and the logic input terminal 10b respectively. That is, bit-error measurement cannot be performed unless the PN-stage number and logic are supplied to the terminals 10a and 10b. For this reason, it is necessary to know a PN-stage number and a logic in advance with respect to receiving data newly inputted. Therefore, the bit error measurement circuit of FIG. 9 suffers from a problem that bit-error measurement cannot be performed with accuracy if the PN-stage number and logic are incorrectly set.

SUMMARY OF THE INVENTION

It is an object of the invention to provide a bit error measurement circuit which is capable of automatically recognizing and setting a correct PN-stage number and/or a logic with respect to receiving data newly inputted so that bit-error measurement is performed on the receiving data with accuracy.

A bit error measurement circuit of the invention is designed to measure a number of bit errors by comparing receiving data with a reference PN pattern. Herein, a certain PN pattern is used as the receiving data in order to perform testing in performance of communications and transmission by evaluating the receiving data. There are provided multiple kinds of PN patterns each having a specific PN-stage number. The bit error measurement circuit is capable of automatically detecting a PN-stage number with respect to the receiving data.

One method to do so is to perform comparison between the receiving data and an arbitrary pattern at timings which are periodically set to correspond to all PN-stage numbers each having a probability to be related to the receiving data. The arbitrary pattern is extracted from the receiving data at an arbitrary timing; and a number of bits of the arbitrary pattern is determined to respond to a maximum PN-stage number. Thus, the PN-stage number is automatically detected in response to the timing at which the receiving data coincide with the arbitrary pattern. Another method is to extract consecutive-0s patterns and consecutive-1s patterns from the receiving data and to perform comparison between a count value, corresponding to a number of bits of a longest consecutive-0s pattern, and a count value corresponding to a number of bits of a longest consecutive-1s pattern. So, a PN-stage number and a logic are detected based on result of the comparison between the count values. Thus, a reference PN pattern is generated based on the PN-stage number and the logic.

Thus, bit-error measurement is performed using the reference PN pattern whose PN-stage number is automatically detected based on the receiving data.

BRIEF DESCRIPTION OF THE DRAWINGS

These and other objects of the subject invention will become more fully apparent as the following description is read in light of the attached drawings wherein:

FIG. 4 shows an example of a configuration of patterns which emerge in one period of receiving data;

DESCRIPTION OF THE PREFERRED EMBODIMENTS

[A] First Embodiment

Figure 1:
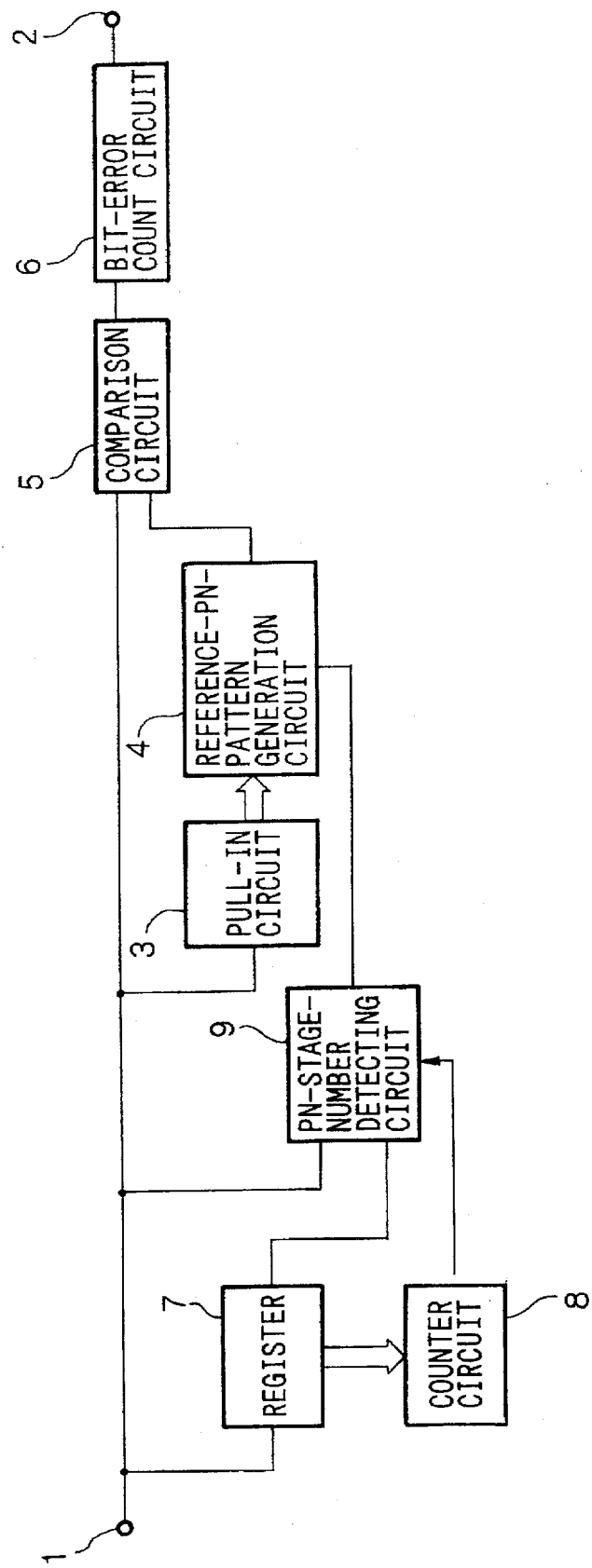
FIG. 1 is a block diagram showing a configuration of a bit error measurement circuit which is designed in accordance with a first embodiment of the invention.
Figure 6:
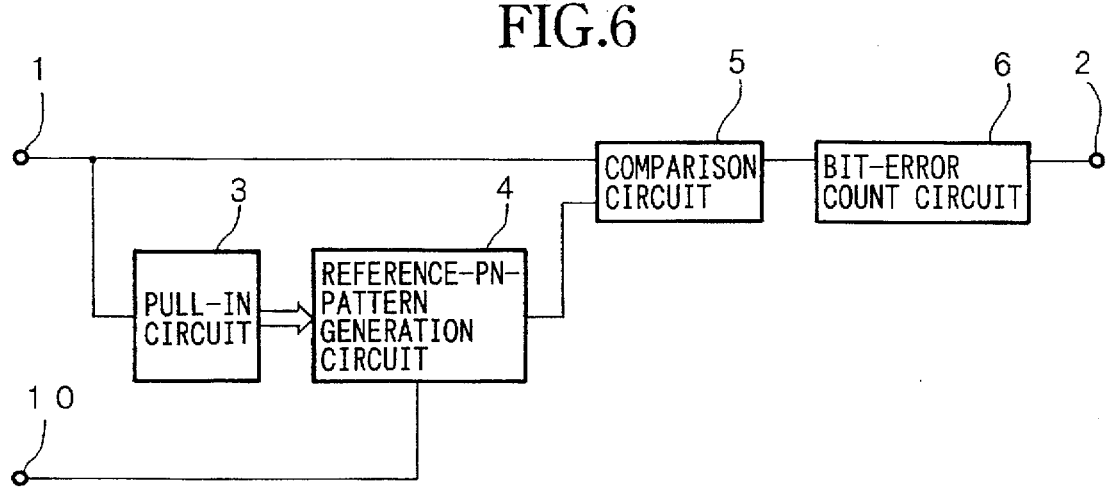
FIG. 6 is a block diagram showing an example of the bit error measurement circuit which is used as a basis for design of the bit error measurement circuit of FIG. 1.
Figure 7:
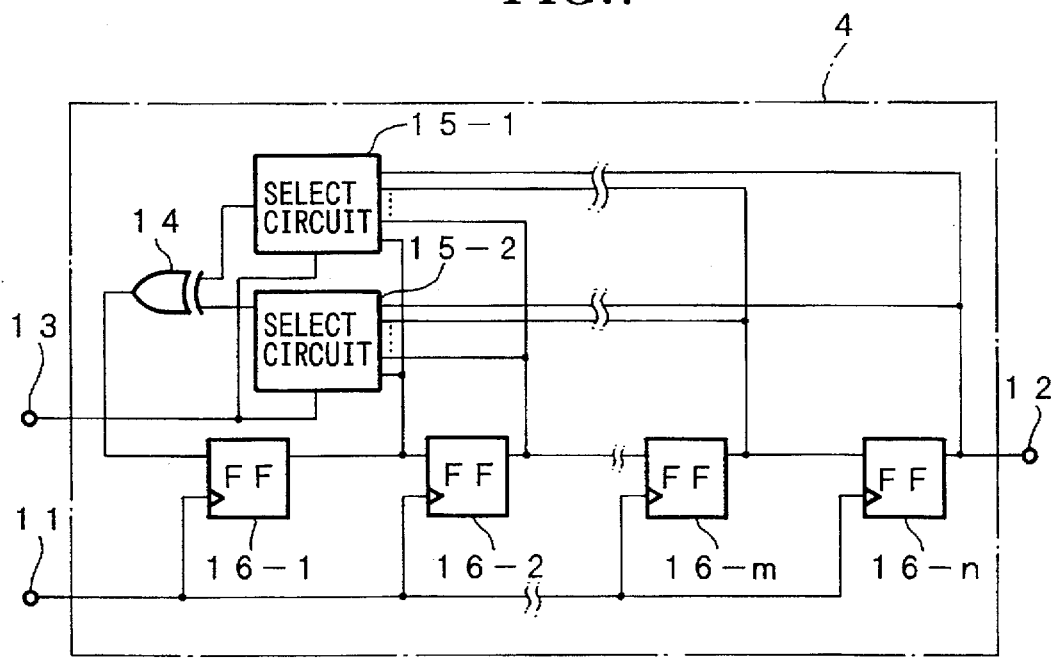
FIG. 7 is a block diagram showing an internal configuration of a reference-PN-pattern generation circuit shown in FIGS. 1 and 6.

FIG. 1 shows a bit error measurement circuit which is designed in accordance with a first embodiment of the invention. The circuitry of FIG. 1 is designed to eliminate problems of the circuitry of FIG. 6. That is, the bit error measurement circuit of FIG. 1 is designed to detect a PN-stage number of receiving data inputted to the receiving-data input terminal 1 and automatically set it to the reference-PN-pattern generation circuit 4. So, the bit error measurement circuit of FIG. 1 is constructed by a register 7, a counter circuit 8 and a PN-stage-number detecting circuit 9 in addition to the pull-in circuit 3, the reference-PN-pattern generation circuit 4, the comparison circuit 5 and the bit-error count circuit 6.

The register 7 extracts and retains an arbitrary pattern, consisting of bits which consecutively emerge in receiving data inputted to the receiving-data input terminal 1, at a timing arbitrarily set. If a maximum PN-stage number of the receiving data is represented by 'b', a number of bits of the arbitrary pattern is not less than 'b'. If a number of bits of the arbitrary pattern is less than 'b', there is a possibility that multiple patterns, whose number of bits is less than 'b', may exist within one period of the receiving data. In that case, it is not possible to detect a PN-stage number of the receiving data.

When the register 7 starts to extract an arbitrary pattern from the receiving data, the counter circuit 8 starts to count a number of bits of the receiving data. Thereafter, when the counter circuit 8 completes to count $(2^a-1)$ bits (where 'a' is an integer), the counter circuit 8 outputs a pulse to the PN-stage-number detecting circuit 9. Herein, the number of 'a' is determined to respond to all the PN-stage numbers each having a probability to be related to the receiving data inputted to the receiving-data input terminal 1. In addition, if 'b' represents the maximum PN-stage number of the receiving data inputted to the receiving-data input terminal 1, the counter circuit 8 should have a capability to count more than $(2^b-1)$ bits. Thus, the counter circuit 8 periodically outputs pulses at timings which are determined to respond to all PN-stage numbers.

At a timing when the counter circuit 8 outputs a pulse to the PN-stage-number detecting circuit 9, the PN-stage-number detecting circuit 9 compares the receiving data, inputted to the receiving-data input terminal 1, with the arbitrary pattern retained by the register 7, thus detecting a PN-stage number. Based on result of detection, the PN-stage-number detecting circuit 9 automatically sets an accurate PN-stage number to the reference-PN-pattern generation circuit 4. That is, if at a timing when the counter circuit 8 produces a count value of $(2^x-1)$ to output a pulse, the PN-stage-number detecting circuit 9 detects that receiving data coincide with an arbitrary pattern retained in the register 7, the PN-stage-number detecting circuit 9 declares that the receiving data have a PN-stage number 'x'. Thus, the PN-stage-number detecting circuit 9 controls the setting of the reference-PN-pattern generation circuit 4 to produce a reference PN pattern of the PN-stage number x.

After completion of the setting of the PN-stage number of the reference-PN-pattern generation circuit 4, the pull-in circuit 3 controls the reference-PN-pattern generation circuit 4 to output reference data which synchronize with the receiving data. Then, the comparison circuit 5 performs comparison between the receiving data and reference data. The bit-error count circuit 6 counts a number of pulses outputted from the comparison circuit 5. A count value of the bit-error count circuit 6 is outputted to the bit-error-count-value output terminal 2. Thus, bit-error measurement will be performed.

Figure 2:
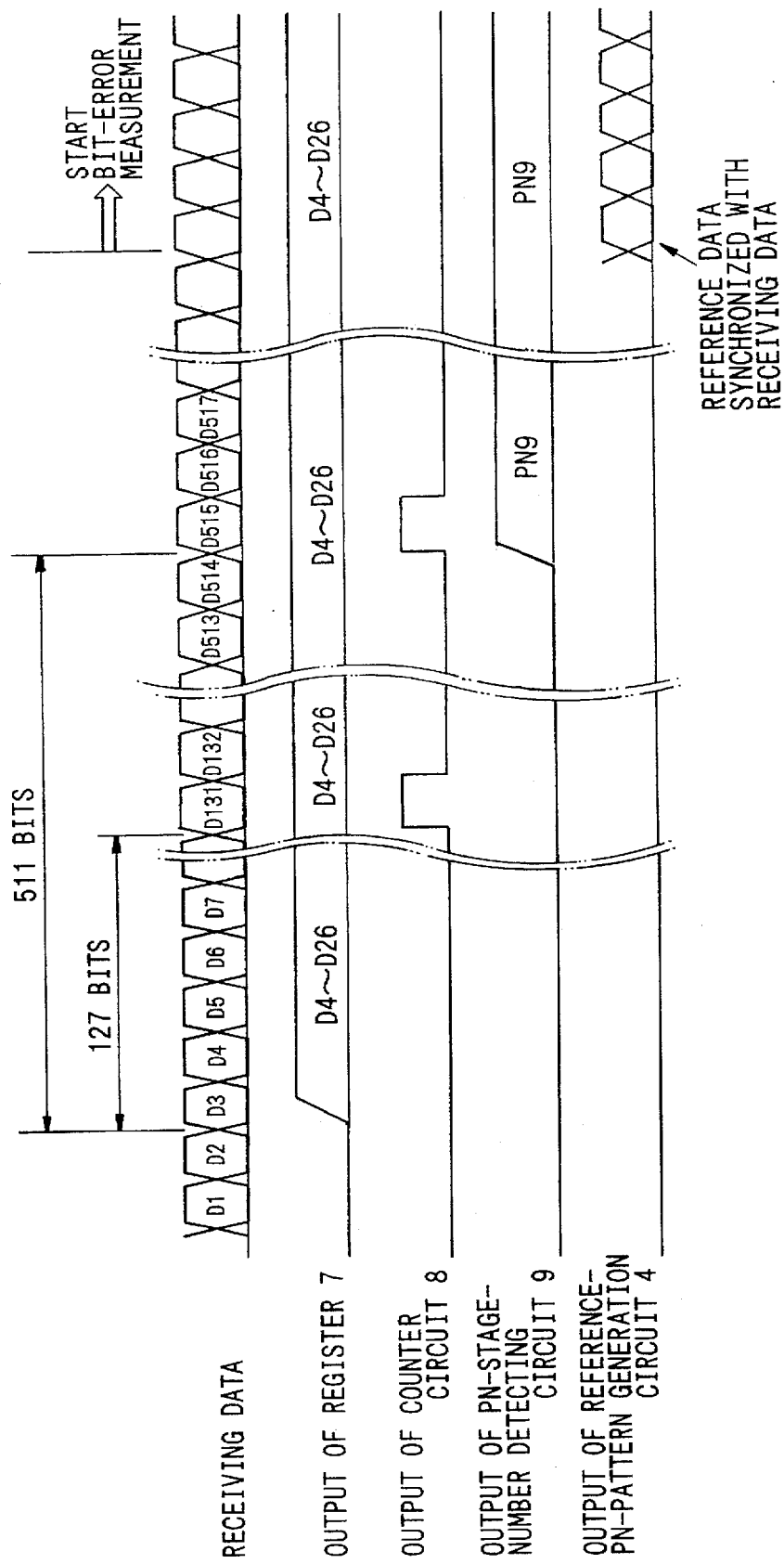
FIG. 2 is a time chart showing data forms which are used to explain operation of the bit error measurement circuit of FIG. 1.

Next, an example of the operation of the bit error measurement circuit of FIG. 1 will be described with reference to a time chart of FIG. 2. For convenience sake, numerals D1, D2, ... are assigned to bits of receiving data respectively. The time chart of FIG. 2 shows that a PN pattern used as the receiving data has one of the PN-stage numbers 7, 9, 11, 15 and 23 shown in FIG. 8, for example. Now, the receiving-data input terminal 1 currently receives a PN pattern having the PN-stage number 9.

Figures 8, 9:
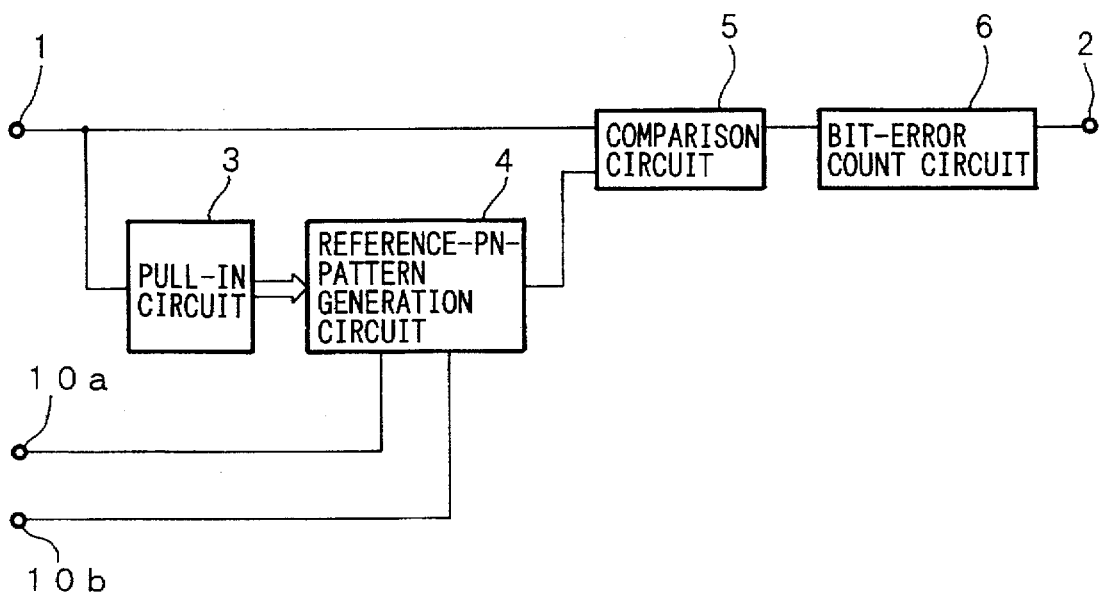
FIG. 8 shows a manner to perform an exclusive-or operation with respect to each of PN-stage numbers which are provided for receiving data.
FIG. 9 is a block diagram showing an example of the bit error measurement circuit which is used as a basis for design of the bit error measurement circuit of FIG. 3.
Figure 10:
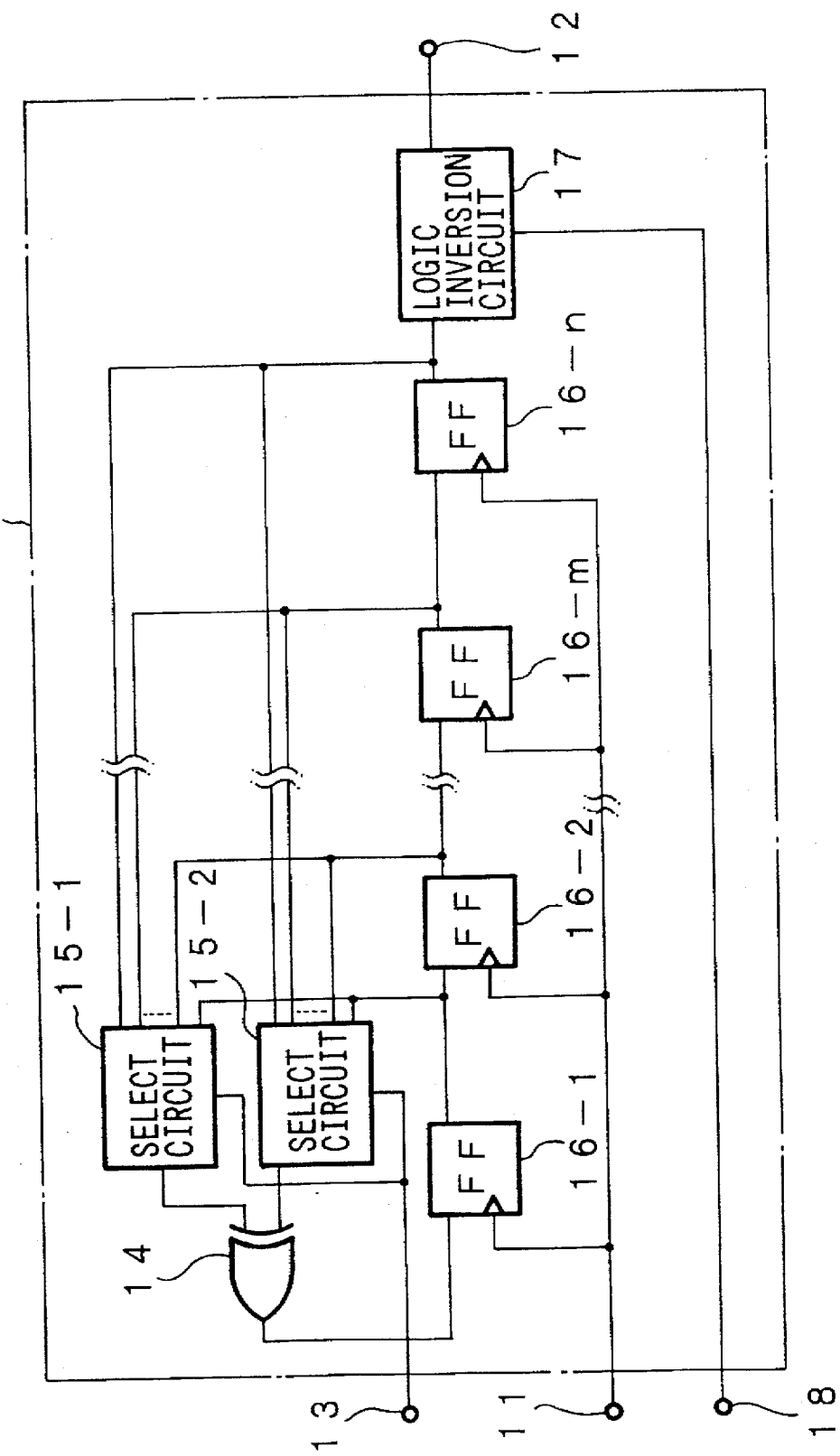
FIG. 10 is a block diagram showing an internal configuration of a reference-PN-pattern generation circuit shown in FIGS. 3 and 9.

The register 7 extracts and retains an arbitrary pattern whose bits consecutively emerge in the receiving data inputted to the receiving-data input terminal 1, wherein numerals of the bits start from D4. So, the register 7 outputs the arbitrary pattern having the bits whose numerals start from D4. FIG. 8 shows that the maximum PN-stage number is '23'. So, a number of bits of the arbitrary pattern retained in the register 7 coincides with '23'. That is, the register 7 retains and outputs the arbitrary pattern consisting of the bits D4 to D26.

When the register 7 starts to retain the bits D4 to D26, the counter circuit 8 starts to count a number of bits of the receiving data which are inputted to the receiving-data input terminal 1. Herein, the receiving data have a probability to be related to one of the aforementioned PN-stage numbers shown in FIG. 8. So, when the counter circuit 8 completes to count a number of bits which coincides with one of the numbers of $(2^7-1)$, $(2^9-1)$, $(2^{11}-1)$, $(2^{15}-1)$ and $(2^{23}-1)$, the counter circuit 8 outputs a pulse. That is, the counter circuit 8 outputs a first pulse when completing to count '127' bits (i.e., $(2^7-1)$ bits) from the bit D4 of the arbitrary pattern retained in the register 7.

The PN-stage-number detecting circuit 9 detects a certain number of bits of the receiving data which start from D131 and end at D153. Herein, the bit D131 emerges at a moment when the counter circuit 8 outputs the first pulse, whilst the PN-stage-number detecting circuit 9 detects consecutive 23 bits which start from the bit D131. The PN-stage-number detecting circuit 9 compares the detected bits D131 to D153 with the retained bits D4 to D26 which are outputted from the register 7. By the way, the PN patterns which are inputted to the receiving-data input terminal 1 have a characteristic that a pattern of consecutive bits corresponding to one PN-stage number does not coincide with a pattern of consecutive bits corresponding to another PN-stage number. In other words, one period of receiving data corresponding to the PN-stage number 9 contain only one pattern consisting of consecutive 9 bits or more. Thus, in a period of the PN-stage number 7, the detected bits D131 to D153 do not coincide with the retained bits D4 to D26. Therefore, the PN-stage-number detecting circuit 9 does not detect a PN-stage number.

Next, when the counter circuit 8 completes to count 511 bits (i.e., $(2^9-1)$ bits), the counter circuit 8 outputs a second pulse. In this case, the PN-stage-number detecting circuit 9 detects consecutive 23 bits which range between D515 and D537, wherein the bit D515 emerges at a moment when the counter circuit 8 outputs the second pulse. So, the PN-stage-number detecting circuit 9 compares the detected bits D515 to D537 with the retained bits D4 to D26 which are outputted from the register 7. In the current situation, the PN-stage number 9 is set to the receiving data inputted to the receiving-data input terminal 1. This means that the receiving data have a period of 511 bits (i.e., $(2^9-1)$ bits). As a result, the bits D515 to D538 belong to a second period of receiving data next to a first period of receiving data which contain the bits D4 to D26 outputted from the register 7. For this reason, the PN-stage-number detecting circuit 9 detects coincidence between the detected bits and retained bits. So, the PN-stage-number detecting circuit 9 detects the PN-stage number 9 from the receiving data because the coincidence is detected by the second pulse of the counter circuit 8 which corresponds to '511' bits (i.e., ($2^9-1$) bits) counted from the bit D4. Thus, the PN-stage-number detecting circuit 9 outputs data representing the PN-stage number 9 to the reference-PN-pattern generation circuit 4.

After the PN-stage-number detecting circuit 9 succeeds to detect the PN-stage number, the reference-PN-pattern generation circuit 4 outputs a reference PN pattern which synchronizes with the receiving data under the control of the pull-in circuit 3. After the reference-PN-pattern generation circuit 4 outputs the reference PN pattern, the bit-error count circuit 6 cooperates with the comparison circuit 5 to perform counting of bit errors.

As described heretofore, the register 7 starts to retain a pattern of consecutive bits within receiving data, inputted to the receiving-data input terminal 1, at a timing arbitrarily set. Then, the PN-stage-number detecting circuit 9 and the counter circuit 8 cooperate together to perform monitoring as to by which period, consisting of a certain number of bits, the pattern retained in the register 7 exists in receiving data inputted to the receiving-data input terminal 1, thus setting a PN-stage number for the reference-PN-pattern generation circuit 4. Such a manner of detecting the PN-stage number is effective because the PN patterns have a nature that a pattern consisting of consecutive 'a' bits or more exists only one time in one period of a PN pattern of a PN-stage number 'a', for example.

The first embodiment of the invention is designed to use the aforementioned nature of the PN patterns, wherein the register 7, the counter circuit 8 and the PN-stage-number detecting circuit 9 cooperate together to detect a 'correct' PN-stage number with respect to the receiving data inputted to the receiving-data input terminal 1. The PN-stage number detected is set to the reference-PN-pattern generation circuit 4. Thus, the reference-PN-pattern generation circuit 4 generates reference data which synchronize with the receiving data under the operation of the pull-in circuit 3. Thereafter, the comparison circuit 5 and the bit-error count circuit 6 cooperate together to perform bit-error measurement.

[B] Second Embodiment

Figure 3:
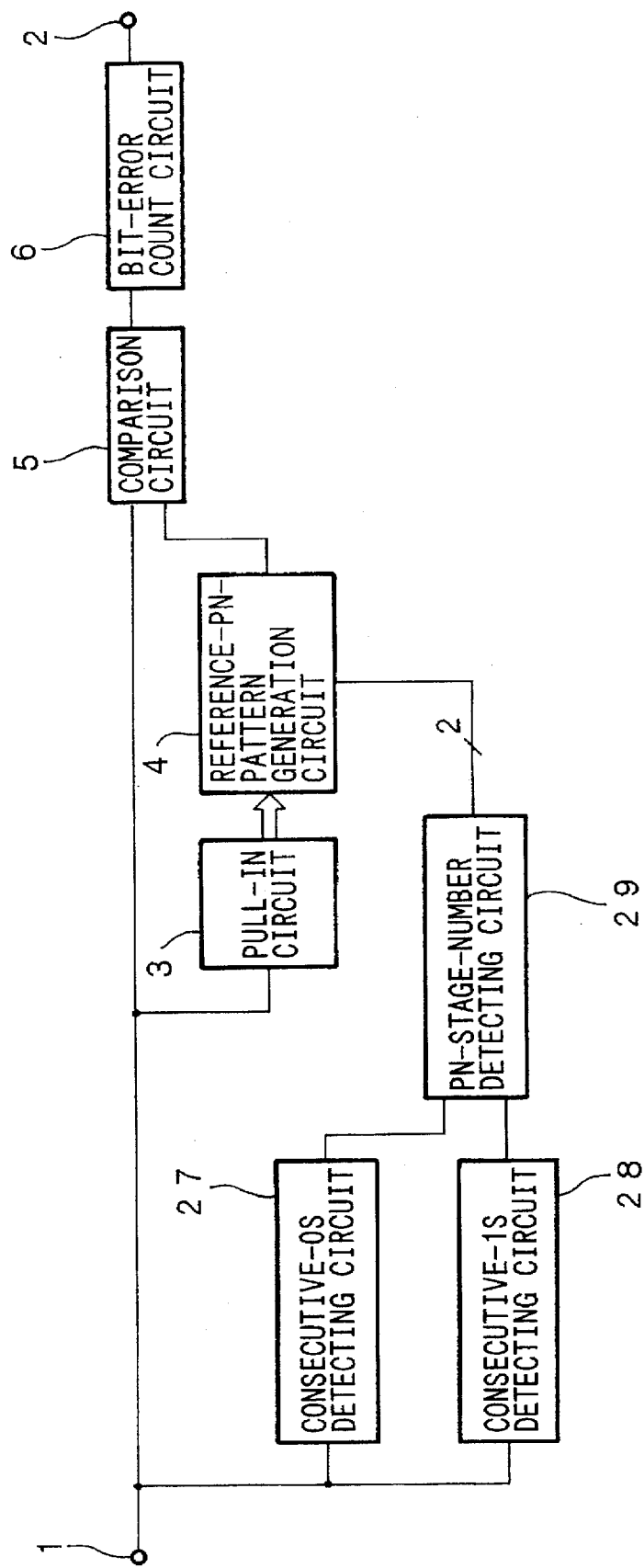
FIG. 3 is a block diagram showing a configuration of a bit error measurement circuit which is designed in accordance with a second embodiment of the invention.

FIG. 3 shows a bit error measurement circuit which is designed in accordance with a second embodiment of the invention. The bit error measurement circuit of FIG. 3 is designed on the basis of the aforementioned bit error measurement circuit of FIG. 9. Therefore, in addition to the circuit elements of FIG. 9, the bit error measurement circuit of FIG. 3 further provides a consecutive-0s detecting circuit 27, a consecutive-1s detecting circuit 28 and a PN-stage-number detecting circuit 29, by which a PN-stage number and a logic are automatically detected.

The consecutive-0s detecting circuit 27 detects patterns, each of which consists of digits '0s' which consecutively emerge in receiving data inputted to the receiving-data input terminal 1, wherein those patterns are called 'consecutive-0s patterns' Then, the circuit 27 counts a number of bits with respect to each of the patterns, thus selecting a pattern whose number of bits is the largest. So, the circuit 27 retains a largest number of bits of the selected pattern. In contrast to the consecutive-0s detecting circuit 27, the consecutive-1s detecting circuit 28 detects patterns, each of which consists of digits '1s' which consecutively emerge in receiving data inputted to the receiving-data input terminal 1, wherein those patterns are called 'consecutive-1s patterns'. Then, circuit 28 counts numbers of bits of the patterns to select a pattern whose number of bits is the largest. So, the circuit 28 retains a largest number of bits of the selected pattern.

In other words, the consecutive-0s detecting circuit 27 monitors the receiving data to count a number of bits of a longest consecutive-0s pattern which emerges in the receiving data, thus outputting its count value. The consecutive-1s detecting circuit 28 monitors the receiving data to count a number of bits of a longest consecutive-1s pattern which emerges in the receiving data, thus outputting its count value.

The PN-stage-number detecting circuit 9 produces a PN-stage number and a logic, based on the count values respectively outputted from the circuits 27 and 28, with respect to the receiving data inputted to the receiving-data input terminal 1. Thus, the PN-stage-number detecting circuit 9 sets the PN-stage number and logic to the reference-PN-pattern generation circuit 4. Specifically, the PN-stage-number detecting circuit 9 sets a positive logic to the reference-PN-pattern generation circuit 4 if a difference between the count values of the circuits 27 and 28 is equal to '1', and the count value of the circuit 28 is larger than the count value of the circuit 27. On the other hand, the PN-stage-number detecting circuit 9 sets a negative logic to the reference-PN-pattern generation circuit 4 if the count value of the circuit 27 is larger than the count value of the circuit 28. In addition, the 'larger' count value is used as a value representing the PN-stage number which is set to the reference-PN-pattern generation circuit 4.

The PN-stage number and the logic which are produced by the PN-stage-number detecting circuit 9 are provided to be respectively suited for the PN-state-number input terminal 10a and the logic input terminal 10b shown in FIG. 9. Therefore, after the PN-stage number is set to the reference-PN-pattern generation circuit 4, the pull-in circuit 3 controls the reference-PN-pattern generation circuit 4 to output reference data which synchronize with the receiving data. Then, the comparison circuit 5 compares the receiving data with the reference data. The bit-error count circuit 6 counts a number of pulses outputted from the comparison circuit 5 so as to output its count value to the bit-error-count-value output terminal 2. Thus, bit-error measurement will be performed.

By the way, PN patterns have a nature that, for example, patterns (i.e., consecutive-1s patterns and consecutive-0s patterns) shown in FIG. 4 are provided in one period of a PN pattern which has a PN-stage number 'a' and a positive logic and which consists of ($2^a-1$) bits. FIG. 4 shows that only one consecutive-a1s pattern which consists of 'a' bits exists in one period of the PN pattern having the PN-stage number 'a' and positive logic, whilst no consecutive-0s pattern, which consists of 'a' bits, exists in one period of the PN pattern. In addition, FIG. 4 shows that no consecutive-1s pattern, which consists of (a−1) bits, exists in one period of the PN pattern, whilst only one consecutive-0s pattern, which consists of (a−1) bits, exists in one period of the PN pattern. Further, '$2^{(a-3)}$' shown in a left column of FIG. 4 indicates a number of bits of digits 1s which exist in one period of the PN pattern, whilst '$2^{(a-3)}$' shown in a right column of FIG. 4 indicates a number of bits of digits 0s which exist in one period of the PN pattern, Meanwhile, a PN pattern having the PN-stage number 'a' and a negative logic is inverse to the PN pattern having the PN-stage number 'a' and the positive logic. So, a table form for the PN pattern of the negative logic can be created by changing the content of FIG. 4 such that numbers corresponding to consecutive1s patterns and numbers corresponding to consecutive-0s patterns are changed with each other. According to the table form created for the PN pattern of the negative logic, only one consecutive-0s pattern consisting of 'a' bits and only one consecutive-1s pattern consisting of (a−1) bits are present in one period of the PN pattern of the negative logic. In addition, none of a consecutive-1s pattern consisting of 'a' bits and a consecutive-0s pattern consisting of (a−1) bits are present in one period of the PN pattern of the negative logic.

As described above, a configuration of patterns which exist in one period of the PN pattern can be shown by the table form of FIG. 4. Therefore, it is possible to detect a PN-stage number with respect to receiving data by detecting a number of bits of a longest consecutive-0s pattern as well as a number of bits of a longest consecutive-1s pattern. Now, suppose a condition where 'b' represents a number of bits of a longest consecutive-1s pattern, whilst 'b−1' represents a number of bits of a longest consecutive-0s pattern. Based on the above condition, it is possible to determine that receiving data correspond to a PN pattern which has a PN-stage number 'b' and a positive logic. Next, suppose another condition where 'b−1' represents a number of bits of a longest consecutive-1s pattern, whilst 'b' represents a number of bits of a longest consecutive-0s pattern. Based on this condition, it is possible to determine that receiving data correspond to a PN pattern which has a PN-stage number 'b' and a negative logic.

As described above, the present embodiment monitors the receiving data so as to count a number of bits with respect to a longest consecutive-0s pattern and a longest consecutive-1s pattern. Then, a PN-stage number and a logic are determined with respect to the receiving data and are set to the reference-PN-pattern generation circuit 4. So, reference data are produced with being synchronized with the receiving data. Thus, bit-error measurement will be performed.

Figure 5:
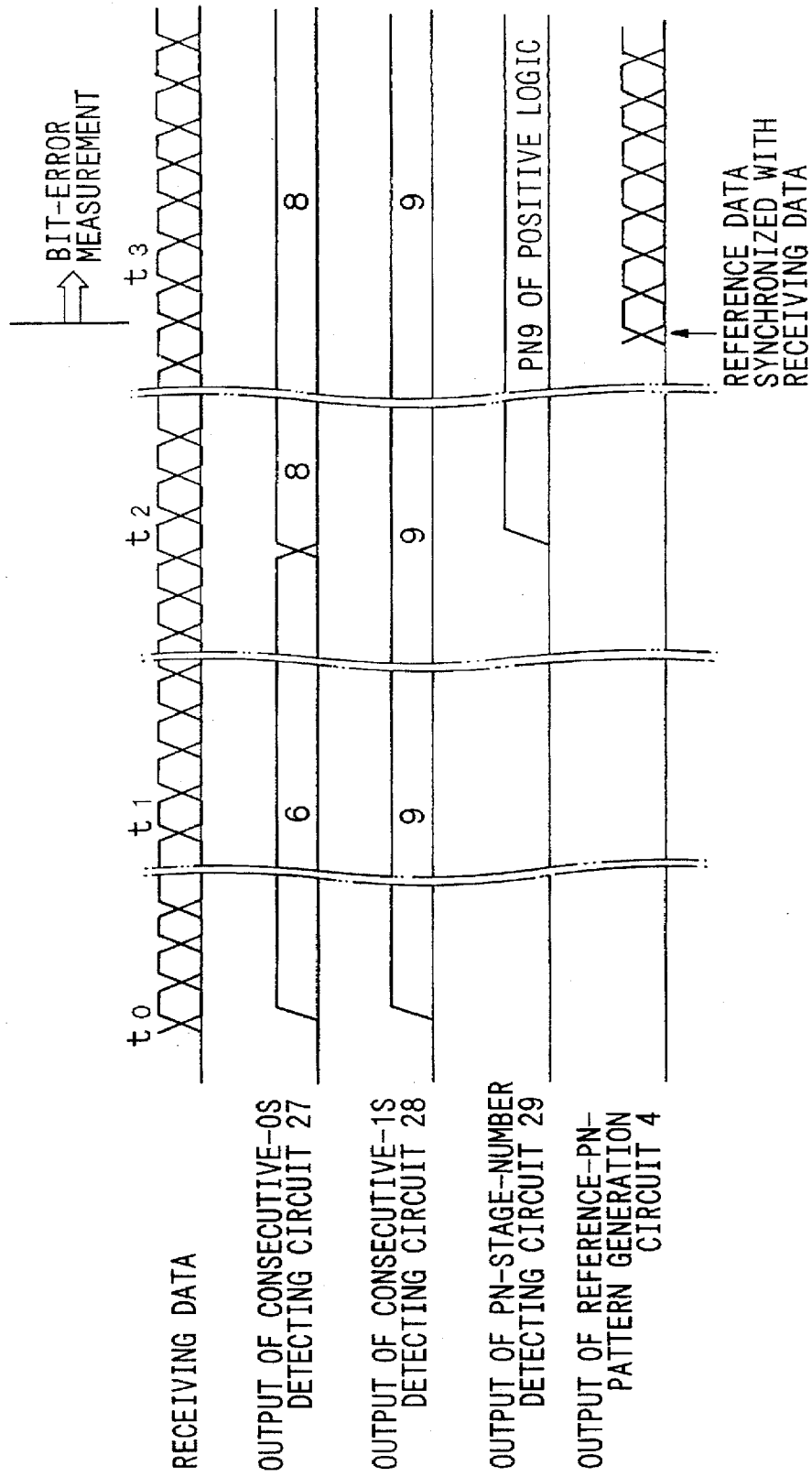
FIG. 5 is a time chart showing data forms which are used to explain operation of the bit error measurement circuit of FIG. 3.

Next, operation of the bit error measurement circuit of FIG. 3 will be described with reference to a time chart of FIG. 5. FIG. 5 shows an example in which a PN pattern, which is used as receiving data, has one of the PN-stage numbers 7, 9, 11, 15, 17 and 23 shown in FIG. 8. Now, a PN pattern which has the PN-stage number 9 and positive logic is currently supplied to the receiving-data input terminal 1.

At a time t0, receiving data are inputted to the receiving-data input terminal 1. Thus, the consecutive-0s detecting circuit 27 counts a number of bits with respect to each of consecutive-0s patterns which emerge in the receiving data, so that the consecutive-0s detecting circuit 27 retains and outputs a maximum count value. In addition, the consecutive-1s detecting circuit 28 counts a number of bits with respect to each of consecutive-1s patterns which emerge in the receiving data, so that the consecutive-1s detecting circuit 28 retains and outputs a maximum count value.

The consecutive-0s detecting circuit 27 detects a count number of '6' as a number of bits of a longest consecutive-0s pattern which emerges in the receiving data in a period of time between t0 and t1. So, this count value of '6' is continuously outputted from the consecutive-0s detecting circuit 27.

On the other hand, the consecutive-1s detecting circuit 28 detects a count number of '9' as a number of bits of a longest consecutive-1s pattern which emerges in the receiving data in the period of time between t0 and t1. So, this count value of '9' is continuously outputted from the consecutive-1s detecting circuit 28. At the time t1, a difference between the count values of the circuits 27 and 28 is equal to '3'; therefore the PN-stage-number detecting circuit 29 cannot produce a PN-stage number and a logic with respect to the receiving data.

At a time t2, the consecutive-0s detecting circuit 27 detects a consecutive-0s pattern which consists of 8 bits in the receiving data; therefore the consecutive-0s detecting circuit 27 retains and outputs a count number of '8'. At this time, a difference between the count values of the circuits 27 and 28 becomes equal to '1'; therefore the PN-stage-number detecting circuit 29 can detect a PN-stage number with respect to the receiving data. In this case, the consecutive-0s detecting circuit 27 outputs the count value of '8', whilst the consecutive-1s detecting circuit 28 outputs the count value of '9'. So, the PN-stage-number detecting circuit 29 detects that the receiving data correspond to a PN pattern which has a PN-stage number 9 and a positive logic. Thus, the PN-stage number 9 and positive logic are set to the reference-PN-pattern generation circuit 4.

After receiving the PN-stage number and logic from the PN-stage-number detecting circuit 29, the reference-PN-pattern generation circuit 4 produces a reference PN pattern which synchronizes with the receiving data under the control of the pull-in circuit 3. The reference-PN-pattern generation circuit 4 outputs the reference PN pattern at a time t3. The comparison circuit 5 and the bit-error count circuit 6 cooperate together to perform counting of bit errors after the reference-PN-pattern generation circuit 4 outputs the reference PN pattern.

Lastly, the circuit elements and configuration of the bit error measurement circuit of the invention are not limited to those of the embodiments.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within meets and bounds of the claims, or equivalence of such meets and bounds are therefore intended to be embraced by the claims.

What is claimed is:

1. A bit error measurement circuit comprising:
    PN-stage number detecting means for automatically detecting a PN-stage number of a PN pattern which relates to receiving data, wherein the PN-stage number is detected as one of PN-stage numbers which are determined in advance and each of which has a probability to be related to the receiving data;
    reference-PN-pattern generation means for generating a reference PN pattern based on the PN-stage number which is detected by the PN-stage number detecting means, wherein the reference PN pattern is outputted with being synchronized with the receiving data; and
    bit-error measurement means for performing comparison between the receiving data and the reference PN pattern, so that a number of bit errors is measured based on result of the comparison.

2. A bit error measurement circuit comprising:
    a register for retaining an arbitrary pattern consisting a number of bits arbitrarily selected which emerge consecutively in receiving data;
    a counter circuit for starting to count a number of bits of the receiving data when the register starts to retain the arbitrary pattern, so that the counter circuit outputs a pulse when a count value thereof coincides with a predetermined number;
    a PN-stage-number detecting circuit for comparing a certain range of the receiving data, which relates to a timing when the counter circuit outputs the pulse, with the arbitrary pattern outputted from the register, thus detecting a PN-stage number with respect to the receiving data;

a pull-in circuit for monitoring the receiving data;

a reference-PN-pattern generation circuit for generating a reference PN pattern based on the PN-stage number supplied thereto from the PN-stage-number detecting circuit in such a way that the reference PN pattern synchronizes with the receiving data under control of the pull-in circuit;

a comparison circuit for comparing the receiving data with the reference PN pattern so as to output a number of pulses which corresponds to a number of differences detected between the receiving data and the reference PN pattern; and a bit-error count circuit for counting the number of the pulses so as to output a count number representing a number of bit errors.

3. A bit error measurement circuit as defined in claim 2 wherein the counter circuit outputs the pulse when the count value thereof coincides with a number of $(2^a-1)$ where 'a' is an integer arbitrarily selected.

4. A bit error measurement circuit as defined in claim 3 wherein 'a' is determined to correspond to all PN-stage numbers each having a probability to be related to the receiving data.

5. A bit error measurement circuit as defined in claim 2 wherein the number of the bits which construct the arbitrary pattern retained by the register is determined not to be less than 'b' where 'b' is an integer representing a maximum PN-stage number which relates to the receiving data.

6. A bit error measurement circuit as defined in claim 2 wherein the counter circuit has a capability of counting a number of $(2^b-1)$ maximally where 'b' is an integer representing a maximum PN-stage number which relates to the receiving data.

7. A bit error measurement circuit comprising:

register means for extracting and retaining an arbitrary pattern consisting of a number of bits which consecutively emerge in receiving data, so that the register means repeatedly outputs the arbitrary pattern;

counter means for counting a number of bits of the receiving data from a first bit of the arbitrary pattern, so that the counter means outputs a pulse when a count value thereof coincides with a number of $(2^a-1)$, where 'a' designates a variable which is changed within PN-stage numbers each having a probability to be related to the receiving data;

PN-stage-number detecting means for detecting coincidence between the arbitrary pattern outputted from the register means and a certain range of the receiving data whose bits are selected responsive to the pulse outputted from the counter means, so that the PN-stage-number detecting means detects a PN-stage number which is matched with the variable 'a' by which the coincidence is detected;

reference-PN-pattern generation means for generating a reference PN pattern based on the PN-stage number supplied thereto from the PN-stage-number detecting means, wherein the reference PN pattern is outputted with being synchronized with the receiving data; and bit-error measurement means for performing comparison between the receiving data and the reference PN pattern, so that a number of bit errors is measured based on result of the comparison.

8. A bit error measurement circuit comprising:

a consecutive-0s detecting circuit for detecting consecutive-0s patterns, each consisting of digits 0s which consecutively emerge in receiving data, so that the consecutive-0s detecting circuit retains and outputs a count value corresponding to a number of bits of a longest consecutive-0s pattern;

a consecutive-1s detecting circuit for detecting consecutive-1s patterns, each consisting of digits 1s which consecutively emerge in the receiving data, so that the consecutive-1s detecting circuit retains and outputs a count value corresponding to a number of bits of a longest consecutive-1s pattern;

a PN-stage-number detecting circuit for detecting a PN-stage number and a logic based on the count values which are outputted from the consecutive-0s detecting circuit and the consecutive-1s detecting circuit respectively;

a pull-in circuit for monitoring the receiving data;

a reference-PN-pattern generation circuit for generating a reference PN pattern having the PN-stage number and the logic which are detected by the PN-stage-number detecting circuit, wherein the reference PN pattern is outputted with being synchronized with the reference data under control of the pull-in circuit;

a comparison circuit for comparing the receiving data with the reference PN pattern so as to output a number of pulses which correspond to differences detected between the receiving data and the reference PN pattern; and a bit-error count circuit for counting the number of the pulses so as to output a count value representing a number of bit errors.

9. A bit error measurement circuit as defined in claim 8 wherein the PN-stage-number detecting circuit detects the PN-stage number only when a difference between the count values outputted from the consecutive-0s detecting circuit and the consecutive-1s detecting circuit respectively is equal to '1', wherein the PN-stage number coincides with a bigger one of the count values.

10. A bit error measurement circuit as defined in claim 8 wherein the PN-stage-number detecting circuit detects the logic only when a difference between the count values outputted from the consecutive-0s detecting circuit and the consecutive-1s detecting circuit respectively is equal to '1', wherein a negative logic is detected when the count value of the consecutive-0s detecting circuit is larger, whilst a positive logic is detected when the count value of the consecutive-1s detecting circuit is larger.

11. A bit error measurement circuit comprising:

consecutive-0s detecting means for detecting consecutive-0s patterns, each consisting of digits 0s which consecutively emerge in receiving data, so that the consecutive-0s detecting means retains and outputs a count value corresponding to a number of bits of a longest consecutive-0s pattern;

consecutive-1s detecting means for detecting consecutive-1s patterns, each consisting of digits 1s which consecutively emerge in the receiving data, so that the consecutive-1s detecting means retains and outputs a count value corresponding to a number of bits of a longest consecutive-1s pattern;

PN-stage-number detecting means for detecting a PN-stage number and a logic with respect to the receiving data only when the count value of the consecutive-0s detecting circuit differs from the count value of the consecutive-1s detecting circuit by '1', wherein the PN-stage number coincides with a bigger one of the count values, and wherein a negative logic is detected when the count value of the consecutive-1s detecting circuit is bigger, whilst a positive logic is detected when the count value of the consecutive-1s detecting circuit is bigger;

reference-PN-pattern generation means for generating a reference PN pattern based on the PN-stage number and the logic which are detected by the PN-stage-number detecting means; and bit-error measurement means for performing comparison between the receiving data and the reference PN pattern, so that bit-error measurement is performed based on result of the comparison.

* * * * *

UNITED STATES PATENT AND TRADEMARK OFFICE
CERTIFICATE OF CORRECTION

PATENT NO. : 5,732,089
DATED : March 24, 1998
INVENTOR(S) : Keiji NEGI

It is certified that error appears in the above-identified patent and that said Letters Patent is hereby corrected as shown below:

Claim 11, column 13, line 2, "consecutive-1s" should read --consecutive-0s--.

Signed and Sealed this

Second Day of November, 1999

Attest:

Q. TODD DICKINSON

Attesting Officer

Acting Commissioner of Patents and Trademarks